July 10, 1962  G. F. STEARN  3,044,031
INSULATION OF HIGH VOLTAGE TRANSFORMERS
Filed Jan. 2, 1959  2 Sheets-Sheet 1

Inventor:
George Fletcher Stearn
By: Stevens, Davis, Miller & Mosher
Attorneys

July 10, 1962    G. F. STEARN    3,044,031
INSULATION OF HIGH VOLTAGE TRANSFORMERS
Filed Jan. 2, 1959    2 Sheets-Sheet 2

Inventor:
George Fletcher Stearn
By: Stevens, Davis, Miller + Mosher
Attorneys

United States Patent Office 3,044,031
Patented July 10, 1962

3,044,031
INSULATION OF HIGH VOLTAGE TRANSFORMERS

George Fletcher Stearn, Stafford, England, assignor to The English Electric Company Limited, London, England, a British company
Filed Jan. 2, 1959, Ser. No. 784,728
1 Claim. (Cl. 336—70)

This invention relates to the insulation of high voltage transformers.

The object of this invention is to provide transformers of improved design where the high voltage windings are spaced axially along the core of the transformer to facilitate their cooling.

According to this invention the transformer comprises a substantailly linear axially-aligned equipotential surface at low potential, solid insulation means surrounding said surface, a plurality of disc coils surrounding said insulation means, said disc coils being wound in a plurality of groups, each group containing at least two layers and said groups being spaced apart axially of the surface to provide cooling ducts therebetween, and means to increase the uniformity of the electrical stress field in said insulation means comprising an insulated metal conductor ring surrounding said insulation means and positioned between axially-spaced layers of adjacent groups of disc coils and means to maintain the ring at a potential substantially equal to the mean of the potentials of the disc coils of said axially-spaced layers.

Figure 1A:
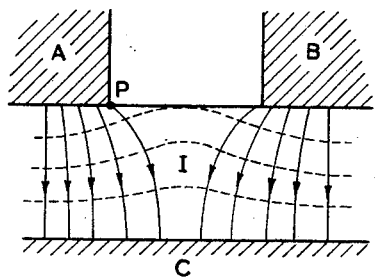
Figure 1B:
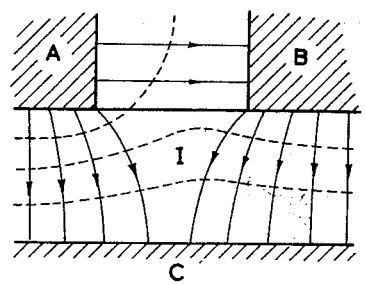
Figure 2A:
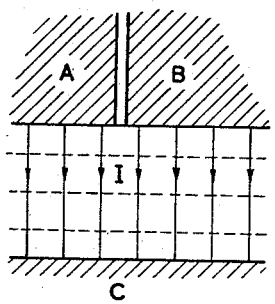
Figure 2B:
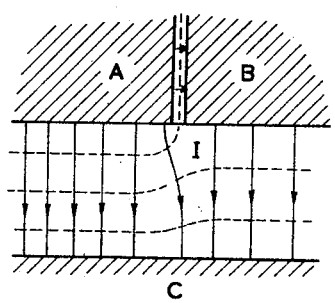
Figure 3A:
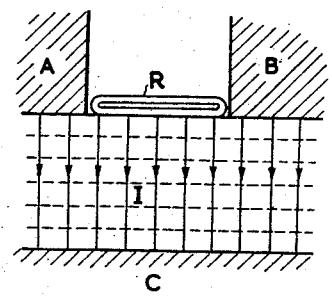
Figure 3B:
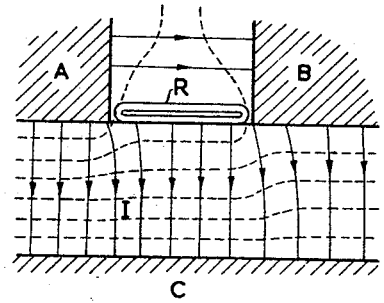
Figure 4:
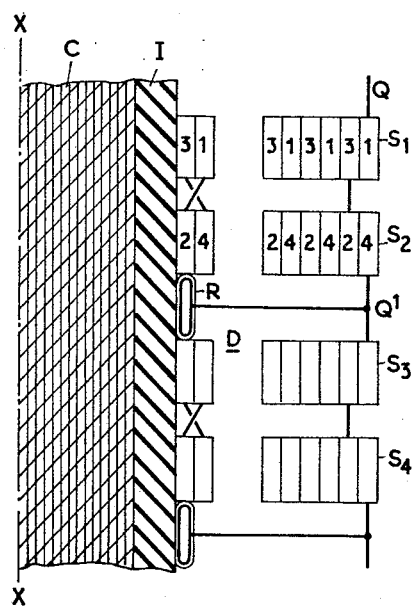

The invention will now be described with reference to the accompanying drawings:

FIG. 1(a) illustrates the stress field in insulation between two coils and a transformer core, the two coils having the same potential with respect to the core, FIG. 1(b) illustrates the stress field in insulation between two coils and a transformer core, the two coils having a different potential with respect to said core, FIG. 2(a) illustrates the system shown in FIG. 1(a) but with the two coils close together, FIG. 2(b) illustrates the system shown in FIG. 1(b) but with the two coils close together, FIG. 3(a) illustrates the system shown in FIG. 1(a) having a stress reducing ring intermediate of the two coils and embodying the invention, FIG. 3(b) illustrates the system shown in FIG. 1(b) having a stress reducing ring intermediate of the two coils and embodying the invention, FIG. 4 illustrates a preferred embodiment of the invention in a transformer having an interleaved winding.

Referring to FIG. 1(a) a cross section is shown of the conductors A and B of two transformer coils which are spaced axially along a transformer core C. The conductors A and B are separated from the core C by solid insulation I. The full lines bearing the arrow heads depict the lines of force within the insulation I when the conductors A and B are at an equal and high potential with respect to the core C. The broken lines running transverse to these lines of force represent lines of equipotential. It will be seen that the insulation I is not uniformly stressed as it would be if the two conductors A and B were close together (see FIG. 2(a)). In practice conductors A and B will not be of the same potential but their potentials will only differ by a small amount in comparison with the potential drop between the conductors and the core C. Thus when the conductors are at a different potential in practice the lines of force and equipotential will be slightly modified as shown in FIGS. 1(b) and 2(b).

To secure optimum advantage from the insulation I it is desirable to subject it to a uniform stress. As is shown in FIGS. 2(a) and 2(b) this can be done by arranging the two conductors A and B close together. However, the need to cool the conductors A and B in practice necessitates that they be separated by a distance which is appreciably greater than the distance needed to provide insulation between the two conductors. The result is that the insulation I is normally subjected to a non-uniform electrical field of the form shown in FIGS. 1(a) and 1(b). To overcome the trouble arising from the increased stress gradients at points such as P, for example (see FIG. 1(a)) it is usual to add extra insulation near this point. Even so, much of the insulation I adjacent the space between the two conductors A and B is not utilised to best advantage.

It is an object of the present invention to provide means for rendering the stress field substantially uniform within the insulation I and yet retain the spacing between the conductors A and B sufficient to permit a good circulation cooling.

In FIGS. 3(a) and 3(b) the systems shown in FIGS. 1(a) and 1(b) are modified by the addition of a stress reducing ring R which has the form of a metal conductor surrounded by a layer of insulation. This ring R is arranged to be maintained at a potential which, in FIG. 3(a) is equal to that of the conductors A and B and which, in FIG. 3(b) is intermediate those of conductor A and conductor B. It is to be noted that in both cases the electrical field within the insulation I is substantially uniform. High stress gradients at points such as P at FIG. 1(a) do not occur in this case.

The lines of force and equipotential shown in the figures are only diagrammatic and have not been drawn with full regard to the magnitude of the potential differences or variations of the electrical properties of the insulating media.

It is evident from this how screening rings such as R in FIGS. 3(a) and 3(b) can be applied to render the stress field within the solid insulation I between a transformer winding and a transformer core substantially uniform in spite of the necessary spacing of the conductors forming coils of the windings to allow for their cooling.

In FIG. 4 a transformer core C is shown to have a central axis X—X and is surrounded by a layer of solid insulation I. The system is presumed to be symmetrical about the axis X—X and, therefore, only one half of the cross sectional view through the system is shown. Also, only a small axial length of the core C and the corresponding insulation and transformer winding is shown in each figure. Two two-layer interleave wound disc coils are shown in each figure, and the connections between the elements of these various coils are such that current entering coil layer $S_1$ passes along a conductor numbered 1 which is interleaved in spiral fashion with a conductor (also forming part of the coil layer $S_1$) numbered 3. Thus current entering a conductor 1 at Q progresses around the transformer core C in spiral fashion gradually approaching the core until the innermost turn of conductor 1 is reached. Then the current passes to a conductor 2 which is interleaved with a further conductor 4, both forming the coil layer $S_2$. The current entering the conductor 2 from conductor 1 travels in spiral fashion towards the outermost turn of conductor 2 from whence it passes to the outermost turn of conductor 3, travels inwards again in coil layer $S_1$, and then passes to the innermost turn of conductor 4 before travelling outwards again to pass from the coil layer $S_2$ at Q'. The current then travels to a corresponding pair of coil layers $S_3$, $S_4$ and traverses a similar electrical path.

The above described interleaving of coil turns safeguards against the adverse effects of high surge voltages (see United States Patent No. 2,453,552). The above arrangement of connections facilitates a tapping of the main windings formed by the coil layers $S_1$, $S_2$, etc., to obtain potentials which are intermediate those of adjacent innermost turns of coil layers $S_1$, $S_2$ etc. For example, the tapping adjacent $Q'$ provides a potential intermediate that of the innermost part of the conductor in coil layer $S_2$ and the innermost part of the conductor in coil layer $S_3$. In the figures stress reducing rings R are shown disposed between axially spaced two layer coils along the length of the core C surrounding the insulation I. These rings are connected to the tappings adjacent $Q'$. In this way a series of rings, spaced along the length of the insulation I, are arranged to have a potential which varies in steps along the length of the insulation. As will be understood from the foregoing description this results in a uniform stressing of the insulation I.

The construction of the stress reducing rings is preferably such that a conducting surface is formed without any sharp ends and this is covered by suitable insulation. The conductor may be formed from metal foil which is formed around an insulating strip of material having rounded edges and the whole then surrounded by a layer of insulation.

In FIG. 4 a cooling medium may be circulated along a duct denoted D.

The coil layers $S_1$ and $S_2$ are arranged much closer together than the coil layers $S_2$ and $S_3$ and the stress reducing ring R is arranged between the coil layers which are widest apart, for example $S_2$ and $S_3$. In this way the rings R are provided where they are most needed; they are able to provide with the conductors of the coil layers a continuous surface which is also virtually as effective as an equipotential surface parallel with the core in rendering the field gradient of the insulation uniform and furthermore they do not interfere with the cross connections between the coils, and they allow the innermost turns of the coils to be arranged closely adjacent the insulation I.

What I claim as my invention and desire to secure by Letters Patent is:

A transformer comprising a substantially linear axially-aligned equipotential surface at low potential, solid insulation means surrounding said surface, a plurality of disc coils surrounding said insulation means, said disc coils being wound in a plurality of groups, each group containing at least two layers and said groups being spaced apart axially of the surface to provide cooling ducts therebetween, and means to increase the uniformity of the electrical stress field in said insulation means comprising an insulated metal conductor ring surrounding said insulation means and positioned between axially-spaced layers of adjacent groups of disc coils and means to maintain the ring at a potential substantially equal to the mean of the potentials of the disc coils of said axially-spaced layers.

References Cited in the file of this patent
UNITED STATES PATENTS

| | | |
|---|---|---|
| 2,414,990 | Weed | Jan. 28, 1947 |
| 2,453,552 | Stearn | Nov. 9, 1948 |
| 2,772,403 | Meyerhans | Nov. 27, 1956 |